United States Patent [19]

Knapton et al.

[11] 4,233,185

[45] Nov. 11, 1980

[54] CATALYSTS FOR OXIDATION AND REDUCTION

[75] Inventors: Arthur G. Knapton, Henley on Thames; Ian R. McGill, Thatcham, both of England

[73] Assignee: Johnson, Matthey & Co., Limited, London, England

[21] Appl. No.: 855,698

[22] Filed: Nov. 29, 1977

[30] Foreign Application Priority Data

Dec. 8, 1976 [GB] United Kingdom ............... 51219/76

[51] Int. Cl.³ .................... B01J 23/10; B01J 23/64
[52] U.S. Cl. .................................. 252/462; 252/465; 252/466 PT; 252/466 B; 252/470; 252/472; 252/477 R; 423/213.5
[58] Field of Search ................ 252/462, 466 PT, 472, 252/465, 466 B, 470; 423/403, 213.5; 427/252, 319, 405, 436; 75/172 R; 204/43 N

[56] References Cited

U.S. PATENT DOCUMENTS

| | | | |
|---|---|---|---|
| 1,978,198 | 10/1934 | Handforth | 423/403 |
| 2,145,651 | 1/1939 | Funk | 75/172 R |
| 3,424,619 | 1/1969 | Adlhart et al. | 75/172 R |
| 3,759,823 | 9/1973 | Davies et al. | 252/466 B |
| 3,840,471 | 10/1974 | Acres | 423/213.5 |
| 3,920,583 | 11/1975 | Pugh | 423/213.5 |
| 3,931,051 | 1/1976 | Dubler | 423/403 X |
| 3,944,504 | 3/1976 | Ford et al. | 423/213.5 |
| 3,979,273 | 9/1976 | Panzera et al. | 427/405 |
| 3,999,956 | 12/1976 | Stueber et al. | 427/252 X |
| 4,048,098 | 9/1977 | Koberstein et al. | 423/213.5 |

FOREIGN PATENT DOCUMENTS 1238013 7/1971 United Kingdom ................ 75/172 R

*Primary Examiner*—W. J. Shine
*Attorney, Agent, or Firm*—Cushman, Darby & Cushman

[57] ABSTRACT

A catalyst suitable for use in oxidation and reduction reactions is provided. The catalyst includes an intermetallic compound of Ru, Pd, Ir or Pt and one or more base metals coated upon a substrate.

17 Claims, No Drawings

CATALYSTS FOR OXIDATION AND REDUCTION

This invention relates to catalysts containing platinum group metals to new compositions of matter containing platinum group metals and to chemical reactions which may be more effectively performed with the said catalysts.

In many gaseous oxidation reactions in which a precious metal acts as a heterogeneous catalysts, it is frequently the case that quantities of the catalyst are lost by factors such as oxidation and volatilization. One reaction in which such a loss is particularly important is in the catalytic oxidation of ammonia during the manufacture of nitric acid.

With few exceptions the oxidation of ammonia gas during the manufacture of nitric acid is carried out on a catalyst comprising a multiplicity of or pack of, fine wire gauzes fabricated from a platinum-base alloy. Typically, in a high pressure installation 20–40 gauzes would be employed woven at 80 meshes per linear inch from 0.003 inch diameter 10% rhodium-platinum wire.

Air mixed with ammonia gas in the approximate ratio 9:1 (by volume) is preheated to about 250° C. and then passed at high velocity through the gauzes. The ensuing catalysed exothermic reaction results in a gauze operating temperature at 850°–950° C., and the oxidation of the ammonia gas is efficiently catalysed to nitrogen oxides and water. The nitrogen oxides are cooled and absorbed in further water to form nitric acid.

During this oxidation process, some of the precious metal of the gauze pack is lost by a combination of oxidation and volatilisation, and is carried away in the gas stream. Various methods have been adopted in the past to reduce these losses including catchment gauzes, trays, filters etc., all being designed to recapture the precious metal from the gas stream after it has been volatilised. These methods have not proved wholly satisfactory, and it is one object of the present invention to reduce the platinum metal losses at source by more rigidly bonding platinum metal atoms to the surface of the gauze. Losses are consequently reduced.

Catalysts in accordance with the present invention are not restricted to use in the oxidation of ammonia and may be used in both oxidising and reducing environments where high temperature, pressure, throughput or some other factor results in a loss of platinum group metal. Examples of other reactions in which catalysts of the invention have applications are (i) the vapour phase oxidation of gases such as $SO_2$, CO HCN and organic molecules such as the hydrocarbons; (ii) and petroleum reforming and hydroforming reactions using a platinum catalyst and a hydrocarbon feedstock; and (iii) the reduction of one or more oxides of nitrogen with a gaseous reducing fuel such as methane.

We have now found that certain intermetallic compounds of Ru, Rh, Pd, Ir and Pt with one or more base metals having high thermodynamic stability and simultaneously maintaining high efficiency as catalysts, for example catalytic oxidation reactions such as the conversion of ammonia to oxides of nitrogen. We prefer to use intermetallic compounds formed with one or more base metals selected from the group consisting of Al, Sc, Y, the lanthanides, Ti, Zr, Hf, Nb and Ta. Of these base metals we prefer to use Zr, Hf, Nb and V.

Some examples of high stability compounds are $AlPt_3$, $TiPt_3$, $ZrPt_3$, $HfPt_3$, $YPd_3$, $LnPd$, $LnPd_3$ and $Ln_5Pd_2$ (where Ln=Sm, Gd, Dy, Ho and Er), $HfIr_3$, $TaIr_3$, $NbIr_3$, $HfIr$, $TaPd$, $TiRu$, $ZrRu$, $NbIr$, $TaRh_3$, $NbRh_3$, $VIr_3$ and $CeRu_2$.

Most of the intermetallic compounds included within the scope of the present invention exhibit extreme hardness or brittleness and it is not practicable to draw and weave them into, for example, a gauze for use in ammonia oxidation.

It is a further object of the present invention to enable intermetallic compounds exhibiting such properties and falling within the scope of the invention to be disposed in a form in which they can be used in catalytic reactions which occur under severe reaction conditions, e.g. the oxidation of ammonia.

We have discovered that when the intermetallic compound is deposited in the form of a coating not more than 15 microns thick upon the surface of a metallic substrate, excessive brittleness is absent and the coated substrate may be handled normally.

Accordingly the present invention includes catalyst comprising a substrate, preferably a metallic substrate, having deposited upon it a continuous or discontinuous surface coating consisting of one or more intermetallic compounds of the general formula $A_xB_y$ where $P_2$ is selected from the group consisting of Ru, Rh, Pd, Ir and Pt, and A is selected from the group consisting of Al, Sc, Y, the lanthanides, Ti, Zr, Hf, V, Nb and Ta and x and y are integral and may have values of 1 or more.

Preferably, the metallic substrate is formed from one or more metals selected from the group comprising Ru, Rh, Pd, Ir and Pt and such a substrate is certainly desirable in the ammonia oxidation reaction. However, base metal substrates may be used or base metal alloys which also contain a platinum group metal component may be used.

Suitable platinum group metal substrates are platinum, 10% rhodium-platinum and dispersion strengthened platinum group metals and alloys as described in British Pat. Nos. 1,280,815 and 1,340,076 and U.S. Pat. Nos. 3,689,987, 3,696,502 and 3,709,667.

Suitable base metal substrates are those capable of withstanding rigorous oxidising conditions. Examples of such base metal alloys are nickel and chromium alloys having an aggregate Ni plus Cr content greater than 20% by weight and alloys of iron including at least one of the elements chromium (3–40) weight %, aluminium (1–10) weight %, cobalt (trace-5) weight %, nickel (trace-72) weight % and carbon (trace-0.5) weight %. Such substrates are described in German DOS No. 2450664.

Other examples of base metal alloys capable of withstanding the rigorous conditions required are the iron-aluminium-chromium alloys which may also contain yttrium, as described in U.S. Pat. No. 3,027,252. One range of such alloys contains 0.5–12 weight % Al, 0.1–3.0 weight %, Y, 0–20 weight % Cr and balance Fe. These are described in U.S. Pat. No. 3,298,826. Another range of Fe-Cr-Al-Y alloys contain 0.5–4 weight % Al, 0.5–3.0 weight % Y, 20.0–95.0 weight % Cr and balance Fe.

Base metal alloys which also contain a platinum group metal component are useful as the metallic substrate for catalysts intended to be used in very fierce oxidising conditions, for example, in catalysts of the combustion in gas turbine engines. Such alloys are described in German DOS No. 2,530,245 and contain at least 40 weight % Ni or at least 40 weight % Co, a trace to 30 weight % Cr and a trace to 15 weight % of one or more of the metals Pt, Pd, Rh, Ir, Os, and Ru. The alloys may also contain from a trace to the percentage specified of any one or more of the following elements:

| | % by weight |
|---|---|
| Co | 25 |
| Ti | 6 |
| Al | 7 |
| W | 20 |
| Mo | 20 |
| Hf | 2 |
| Mn | 2 |
| Si | 1.5 |
| V | 2.0 |
| Nb | 5 |
| B | 0.15 |
| C | 0.05 |
| Ta | 10 |
| Zr | 3 |
| Fe | 20 |
| Th and rare earth metals or oxides | 3 |

Where the metallic substrate is composed either substantially or solely of a platinum group metal it is preferably, but not necessarily, in the form of an interwoven wire gauze or mesh. Where the metallic substrate is composed substantially of base metal it is preferably in the form of perforated or unperforated, corrugated sheet or foil. These types of structures are also described in German DOS No. 2450664.

Preferably the surface coating of intermetallic compound is in the form of a thin film in thickness from 2 microns to 15 microns.

Many compounds of the type $A_xB_y$ are miscible with one another and structures in which the surface coatings deposited upon the said metallic substrate contains more than one compound of the type $A_xB_y$ are within the scope of this invention.

A number of different techniques may be employed to produce a coating in the form of a thin film of the intermetallic compound upon the surface of the metal substrate.

By way of example, aluminium may be deposited onto the surface of rhodium-platinum gauzes by a pack-aluminising process. In this process the gauzes are packed into a heat-resistant container in an appropriate mixture of chemicals such that aluminium is transferred via the vapour phase onto the gauze surface. At the aluminising temperature, typically 800°–1000° C., interaction between the platinum and aluminum occurs to give the required intermetallic compound.

Alternatively, chemical vapour deposition from $ZrCl_4$ can be used to form a layer of $Pt_3Zr$, or electrodeposition may be used either from aqueous or fused salt electrolysis to give the requisite compound.

Whichever method is adopted the objective is to form a layer, preferably but not essentially firmly adherent, of intermetallic compound on the wires of the gauze pack or other substrate.

In another technique the metals forming the intermetallic compound are prepared as an appropriate solution in water or an organic solvent. The compound is caused to deposit upon the metallic substrate (e.g. a gauze) by the addition of a reducing agent. The metallic substrate is placed in the solution whilst the precipitation is taking place and becomes coated with a uniform, microcrystalline layer of the intermetallic compound.

The invention includes an oxide of nitrogen or nitric acid made by a catalyst according to the invention.

The invention will now be described with reference to the following Examples.

EXAMPLE 1

Platinum gauze of conventional ammonia oxidation weave viz. 80 mesh/linear inch, 0.003 in diameter wire, was aluminised for 1 hour at 700° C. in a high activity aluminising pack comprising 94% $Al_2O_3$, 5% Al, 1% $NH_4Cl$. A layer of an intermetallic compound, a platinum aluminide (Pt $Al_2$) is thereby formed on the gauze surface. The aluminised gauze was combined with 10% rhodium-platinum gauze to give a composite pack containing seven and nine of these gauzes respectively, the aluminised material being used as a backing to the pack.

This pack was tested in a high pressure ammonia oxidation pilot plant at 100 psig and 100 tons/m$^2$/day ammonia loading and a conversion efficiency of ammonia to NO of 86.3% was obtained.

EXAMPLE 2

The intermetallic coated gauze of example 1 was leached in a hot solution of 5 M KOH for 1 minute, resulting in removal of some of the aluminium content of the intermetallic compound and activation of the surface.

When tested, the conversion efficiency had been increased to 97%.

EXAMPLE 3

The so called "light off" temperature, that is the temperature at which reaction commences in an ammonia/air mixture in the pressure of a catalyst, is a sensitive measure of catalytic activity in the ammonia oxidation process. The intermetallic coated gauze of example 2 when exposed to a mixture of 10% ammonia in air at atmospheric pressure gave light off at 150° C. compared with 310° C. for conventional 10% rhodium-platinum gauze.

EXAMPLE 4

The intermetallic compound $Pt_3Zr$ was formed on the surface of platinum gauze, of similar dimensions to example 1, by a zirconising treatment at 800° C. for two hours in a pack of the following composition: 2.5% zirconium powder, 1% $NH_4Cl$ and 96.5% $Al_2O_3$. When tested in the high pressure pilot plant the conversion efficiency obtained was 98.2%.

A list of intermetallic compound with their melting points or dissociation temperatures is given in Table 1. We prefer to use the nominal intermediate phases AB of the elements Nb and Ta with Rh and Ir. In any combination (i.e. whatever the values of x and y) these compounds have been found to be the most suitable alternatives to currently available catalyst materials. The materials are unusually ductile and details are in Table 2.

TABLE 1

Intermetallic compounds (A × $B_y$) in order of melting point or dissociation temperature

| Compound | Mpt(°C.) | Compound | Mpt(°C.) | Compound | Mpt(°C.) | Compound | Mpt(°C.) |
|---|---|---|---|---|---|---|---|
| $HfIr_3$ | 2470 | $TaRh(\alpha_1)$ | 1860 | $TiPd_3$ | 1550 | $NdRh_2$ | 1420 |
| $TaIr_3$ | 2450 | $\alpha$-VIr | 1850 | ErPd | 1540 | $Nd_4Rh_3$ | 1420 |

TABLE 1-continued

Intermetallic compounds (A × B$_y$) in order of melting point or dissociation temperature

| Compound | Mpt(°C.) | Compound | Mpt(°C.) | Compound | Mpt(°C.) | Compound | Mpt(°C.) |
|---|---|---|---|---|---|---|---|
| HfIr | 2440 | TiPt | 1833 | CeRu$_2$ | 1539 | Yb$_3$Pd$_4$ | 1415 |
| NbIr$_3$ | 2435 | V$_3$Pt($\epsilon$) | 1800 | Al$_3$Pt$_2$ | 1521 | ThPd | 1412 |
| W$_3$Ru$_2$ | 2300 | HoPd$_3$ | 1730 | Ti$_3$Ir($\epsilon$) | 1520 | Y$_4$Pd$_5$ | 1410 |
| TaPd | 2200 | Zr$_2$Pt | 1727 | MnPd | 1500 | AlPd$_2$ | 1410 |
| HfPt$_5$ | 2175 | Hf$_2$Ir | 1720 | ThIr | >1500 | Al$_2$Pt | 1406 |
| ZrPt$_3$ | 2154 | DyPd$_3$ | 1710 | ThPt | >1500 | Dy$_4$Pd$_5$ | 1400 |
| TiRu | 2150 | ErPd$_3$ | 1710 | ThPd$_3$ | >1500 | Si$_4$Pd$_9$ | 1400 |
| TiIr | 2140 | YPd$_3$ | 1700 | VPt | 1500 | SiPd | 1400 |
| HfPt$_3$ | 2130 | PrRu$_2$ | 1681 | ZrPd$_2$ | 1480 | | |
| Nb$_3$Ir | 2125 | ZrPd$_3$ | 1670 | HoPd | 1480 | | |
| TaIr($\alpha_1$) | 2120 | TaPd$_2$ | 1670 | BePd | 1465 | | |
| Ti 1R$_3$($\gamma$) | 2115 | Nb$_2$Pd | 1650 | Al$_3$Pt$_5$ | 1465 | | |
| ZrPt | 2104 | GdPd$_3$ | 1630 | YbPd | 1460 | | |
| ZrRu | 2100 | AlPd | 1630 | TiPd$_4$ | 1452 | | |
| $\alpha$-VIr$_3$ | 2100 | SmPd$_3$ | 1620 | YPd | 1450 | | |
| TaRh$_3$($\alpha_1$) | 2100 | NdRh$_3$ | 1600 | Er$_4$Pd$_5$ | 1450 | | |
| NbIr($\alpha_2$) | 1985 | ZrPd | 1600 | DyPd | 1450 | | |
| TiPt$_3$ | 1953 | NbPd$_3$ | 1600 | CePd$_3$ | 1437 | | |
| NbRh$_3$ | 1950 | YPt | 1595 | LaRu$_2$ | 1431 | | |
| Hf$_5$Ir$_3$ | 1930 | YPt$_5$ | 1595 | NbRh($\alpha_3$) | 1430 | | |
| $\alpha$-V$_3$Ir | 1930 | AlPt$_3$ | 1556 | Ho$_4$Pd$_5$ | 1430 | | |
| TaPd$_3$ | 1920 | AlPt | 1554 | EuPd$_3$ | 1425 | | |

TABLE 2

Details of the strong but ductile phases found in the systems Ta-Rh, Ta-Ir, Nb-Rh and Nb-Ir

| System | Ductile phase | Crystal structure | Compos. Range Stability | Decomposition | Ref |
|---|---|---|---|---|---|
| Ta-Rh | $\alpha$1 | orthorhombic or hexagonal? | 53.5–61 at.pct.Rh at 1300° C. | Peritectoid ~1860° C. | 52 |
| Ta-Ir | $\alpha$1 | orthorhombic | 50.4 at.pct.Ir at 1950° C. and 61 at.pct. Ir at 2120°.C. | Peritectic ~2120° C. | 51 |
| Nb-Rh | $\alpha$2 | Tetragonal Ll$_O$ AuCu | 51.5 to 52.5 at.pct. Rh 1200° C. | Peritectoid ~1360° C. | 54 |
| | $\alpha$3 | Orthorhombic $\alpha$1(Ta-Rh) | ~54.0 to 55.5 at.pct. RH.at.1200° C. | Peritectoid ~1430° C. | 54 |
| | $\alpha$4 | Orthorhombic B19 AuCd | ~56 to 58.5 at.pct.Rh at 1400° C. | Peritectoid ~1600° C. Eutectoid ~1340° C. | 54 |
| Nb-Ir | $\alpha$2 | Orthorhombic $\alpha$1(Ta-Rh) | 54.5 to 59.5 at.pct.Ir at 1700° C. | Peritectic ~1985° C. | 55 |

What we claim is:

1. A catalyst suitable for use in oxidation and reduction reactions comprising a substrate carrying a coating comprising at least one intermetallic compound selected from the group consisting of TiPt$_3$, LnPd, LnPd$_3$, Ln$_5$Pd$_2$ (where Ln=Sm, Gd, Dy, Ho and Er), TaIr$_3$, NbIr$_3$, TaPd, TiRu, NbIr, TaRh$_3$, NbRh$_3$, VIr$_3$ and CeRu$_2$.

2. A catalyst according to claim 1 wherein the substrate is a metallic substrate.

3. A catalyst according to claim 2 wherein the metallic substrate contains at least one of the metals ruthenium, rhodium, palladium, iridium and platinum.

4. A catalyst according to claim 2 wherein the metallic substrate contains at least one base metal.

5. A catalyst according to claim 3 wherein the metallic substrate is platinum, 10% rhodium-platinum alloy or dispersion-strengthed platinum group metals or alloys thereof.

6. A catalyst according to claim 4 wherein the metallic substrate is made from a nickel and chromium alloy having an aggregate nickel plus chromium content greater than 20% by weight.

7. A catalyst according to claim 4 wherein the metallic substrate is made from an alloy consisting, apart from impurities, of at least one of the elements chromium (3–40) weight %, aluminum (1–10) weight %, cobalt (trace-5) weight %, nickel (trace-72) weight %, and carbon (trace-0.5) weight %, balance iron.

8. A catalyst according to claim 4 wherein the metallic substrate is an alloy consisting, apart from impurities, of 0.5–12 weight % Al, 0.1–3.0 weight % Y, 0–20 weight % Cr and balance Fe.

9. A catalyst according to claim 4 wherein the metallic substrate is an alloy consisting, apart from impurities, of 0.5–4 weight % Al, 0.5–3.0 weight % Y, 20.0–95.0 weight % Cr and balance Fe.

10. A catalyst according to claim 2 wherein the substrate is in the form of interwoven or randomly oriented wire or mesh, perforated or unperforated, corrugated sheet or foil.

11. A catalyst according to claim 1 wherein the said coating has a thickness of not more than 15 microns.

12. A process of making a supported catalyst wherein the substrate comprises interwoven platinum wire, the process comprising heating the substrate at an elevated temperature in an aluminising environment containing Al$_2$O$_3$ and NH$_4$Cl so as to produce an intermetallic compound of, PtAl$_2$ on the surface of the said wire.

13. A catalyst comprising a substrate carrying a coating comprising an intermetallic compound of at least one of the platinum group metals ruthenium, rhodium, palladium, iridium and platinum and one or more base metals, selected from Ta, Nb, Zr, Hf and V, said catalyst being characterized by its high thermodynamic stability and high catalytic efficiency.

14. A catalyst suitable for use in oxidation and reduction reactions comprising a substrate carrying a coating comprising at least one intermetallic compound selected from the group consisting of intermetallic compounds of Ta and Rh, Ta, and Ir, Nb and Rh and Nb and Ir.

15. A catalyst according to claim 14 wherein the intermetallic compound is $TaIr_3$, $NbIr_3$, NbIr or $NbRh_3$.

16. A catalyst according to claim 3 wherein the metallic substrate contains at least one base metal.

17. A catalyst according to claim 14 wherein the substrate is a metallic substrate.

* * * * *